United States Patent [19]

Burnell

[11] Patent Number: 5,272,182

[45] Date of Patent: Dec. 21, 1993

[54] BLOWING AGENT CONCENTRATE AND COMPOSITIONS AND ARTICLE PREPARED THEREFROM

[75] Inventor: Ann M. Burnell, Schenectady, N.Y.

[73] Assignee: General Electric Company, Pittsfield, Mass.

[21] Appl. No.: 986,160

[22] Filed: Dec. 3, 1992

[51] Int. Cl.$^5$ .............................. C08J 9/08; C08J 9/10
[52] U.S. Cl. ..................................... 521/85; 521/92; 521/98; 521/137; 521/138; 521/139
[58] Field of Search ............... 521/98, 139, 85, 92, 521/137, 138

[56] References Cited

U.S. PATENT DOCUMENTS

| | | | |
|---|---|---|---|
| 4,104,323 | 8/1978 | Hansen | 260/829 |
| 4,126,600 | 11/1978 | Gergen et al. | 260/37 N |
| 4,141,876 | 2/1979 | Hansen | 260/874 |
| 4,154,712 | 5/1979 | Lee, Jr. | 260/874 |
| 4,313,864 | 2/1982 | Haaf et al. | 525/901 |
| 4,332,714 | 6/1982 | Haaf et al. | 524/141 |
| 4,334,030 | 6/1982 | Kochanowski | 521/90 |
| 4,360,568 | 11/1982 | Allison | 428/411 |
| 4,425,442 | 1/1984 | Sato et al. | 521/93 |
| 4,444,679 | 4/1984 | Rowland et al. | 252/350 |
| 4,554,294 | 11/1985 | Hunter et al. | 521/93 |
| 4,692,475 | 9/1987 | Rowland et al. | 521/92 |

OTHER PUBLICATIONS

Kirt-Othmer Encyclopedia of Chemical Technology, Third Edition, 1982, John Wiley & Sons, Inc., vol. 20, pp. 365,367; 386–390; 415–418; 535–543;447;465–467.

*Primary Examiner*—Morton Foelak

[57] ABSTRACT

The present invention includes an improved blowing agent concentrate, comprising:

(a) a vinyl aromatic polymer;

(b) a preformed blend of a styrene/diene block copolymer and a hydrocarbon rubber extending oil; and (c) at least one blowing agent.

The blowing agent concentrate is utilized to prepare foamable materials based on a variety of thermoplastic organic polymers. The foamable materials can in turn be molded into a variety of thermoplastic structures.

22 Claims, No Drawings

BLOWING AGENT CONCENTRATE AND COMPOSITIONS AND ARTICLE PREPARED THEREFROM

FIELD OF THE INVENTION

This invention relates in general to foamed plastics and to improved foaming agents for such materials.

BACKGROUND OF THE INVENTION

Foamed thermoplastic materials have become very popular as lightweight structural substitutes for metal in many applications, such as office equipment chassis and various automobile components. In general, the foams are obtained by incorporating a blowing agent into a mixture of the main body of a polymer such as polypropylene, polystyrene, polycarbonate, or polyphenylene ether (PPE). Upon exposure to elevated temperatures, the blowing agent decomposes to form gaseous decomposition products which expand the polymer into the article of interest. The resulting product is characterized by a much lower density as compared to a solid product, which in turn advantageously results in weight reduction and raw material savings.

Blowing agents which are suitable for foaming various thermoplastics are known in the art. Examples include hydrazodicarboxylates, benzamides, and amide derivatives of azodicarboxylic acid, as well as agents which are based on sodium bicarbonate or aluminum hydroxide. The agents are often used in the form of a concentrate, e.g., a blend of the agent itself with a polymer which acts as a carrier. The concentrate can also include plasticizers, e.g., a phosphate such as triphenyl phosphate; as well as deactivators such as zinc oxide.

While blowing agents such as the azodicarboxylic acid-derivatives are very effective in reducing the density of foamed articles, their use can occasionally result in several problems. For example, during the preparation of azodicarboxylic-based concentrates, excessive compounding or extrusion temperatures can destabilize the concentrate, leading to premature expansion of the carrier resin. This in turn can result in undesirable surface appearance, poor cell structure, and less weight reduction for a given amount of blowing agent concentrate.

If the melt viscosity of the carrier resin could be lowered, processing temperatures would not have to be as high, and the above-mentioned problems could be avoided. While the phosphate plasticizers mentioned above help to lower the melt viscosity, it is sometimes desirable not to have this type of plasticizer in the blowing agent concentrate. For example, the volatility of phosphate plasticizers can sometimes result in undesirable "plate-out" during injection molding processes.

Another plasticizer which helps to lower melt viscosity in these concentrates is mineral oil. However, such a material does not always become fully incorporated into the carrier resin matrix, especially when used at high levels. Thus, some of the mineral oil may migrate to the surface of foamed articles, leading to an undesirable appearance and possible paint adhesion problems.

In view of these remarks and the current state of the art, it's apparent that a need exists for improved blowing agent concentrates. The concentrates should have melt viscosities low enough to permit compounding and extrusion without any premature destabilization. Furthermore, the surface migration of any plasticizing agents in the concentrate should be minimized. Moreover, use of the concentrate should permit even and complete dispersion of the blowing agent itself during the expansion process, resulting in a foamed article having substantially uniform cell structure and good surface appearance. Finally, structural foam properties should be maintained.

SUMMARY OF THE INVENTION

The present invention addresses many of the needs discussed above. One primary embodiment is an improved blowing agent concentrate for thermoplastic polymers, comprising:

(a) a vinyl aromatic polymer;

(b) a preformed blend of a styrene/diene block copolymer and a hydrocarbon rubber extending oil; and (c) at least one blowing agent.

Some embodiments can also include polytetrafluoroethylene resin as a nucleating agent.

As described below, this invention also includes foamable compositions which include the above-mentioned blowing agent concentrate, as well as foamed, thermoplastic structures molded from such compositions.

DETAILED DESCRIPTION OF THE INVENTION

Component (a) of tills concentrate is a vinyl aromatic polymer. Examples of such a material include homopolymers such as homopolystyrene (often referred to as "crystal polystyrene") and poly-α-methylstyrene. Other vinyl aromatic polymers which may be used include styrene-acrylonitrile (SAN) copolymers, styrene maleic anhydride (SMA) copolymers, and acrylonitrile-butadiene-styrene (ABS) terpolymers, each of which is generally known in the art.

In preferred embodiments, component (a) is a rubber-modified vinyl aromatic polymer. These materials are well-known, and are described, for example, in U.S. Pat. Nos. 4,824,887 and 3,819,761, incorporated herein by reference. In some preferred embodiments, at least 25% of the vinyl aromatic units in component (a) are derived from an alkenyl aromatic monomer of the formula

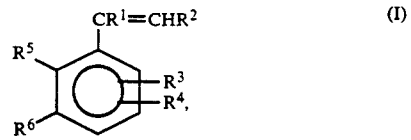

wherein $R^1$ and $R^2$ are selected from the group consisting of hydrogen and lower alkyl or alkenyl groups of from 1 to 6 carbon atoms; $R^3$ and $R^4$ are selected from the group consisting of hydrogen and lower alkyl groups of from 1 to 6 carbon atoms; and $R^5$ and $R^6$ are selected from the group consisting of hydrogen and lower alkyl and alkenyl groups of from 1 to 6 carbon atoms; or $R^5$ and $R^6$ can be concatenated together with hydrocarbyl groups to form a naphthyl group.

It should also be understood that rubber-modified versions of the above-mentioned SMA and SAN materials are also suitable for use as component (a).

Butadiene is the most common type of rubber used for rubber-modified versions of component (a), and the relative amounts of butadiene and vinyl aromatic polymer determine the impact strength-characteristics of this component. Butadiene-modified polystyrene-type materials commonly referred to as "HIPS" (high impact polystyrene) and "MIPS" (medium-impact polystyrene) are suitable for this invention. The weight ratio of butadiene to vinyl aromatic polymer for these materials is usually in the range of about 1:99 to about 20:80, and more preferably, in the range of about 5:95 to about 10:90. Furthermore, component (a) of this invention is usually present at a level of at least about 65% by weight, based on the weight of the entire concentrate, and more preferably, at a level of at least about 75% by weight.

Component (b) of this invention is a preformed blend of a styrene/diene block copolymer and a hydrocarbon rubber extending oil. The styrene/diene (e.g., butadiene, isoprene, etc.) block copolymers are generally known in the art, and are described, for example, in U.S. Pat. Nos. 4,824,887; 4,154,712; 4,126,600; 3,670,054, 3,431,323; and 3,251,905; all incorporated herein by reference. They may be diblock or triblock materials; and may also be either linear or branched in configuration. Furthermore, the block copolymers can be hydrogenated, nonhydrogenated, or partially hydrogenated.

Examples of the diblock materials are the styrene-(ethylene-propylene) block copolymers. Examples of the triblock materials are polystyrene-polybutadiene-polystyrene and polystyrene-polyisoprene-polystyrene block copolymers.

Examples of the branched styrene/diene polymers which are suitable for component (b) are the styrene-butadiene $(SB)_n$ or styrene-isoprene $(SI)_n$ multi-arm copolymers, as well as the ethylene-propylene $(EP)_n$ multi-arm polymers, where "n" for each is in the range of about 3 to 15.

Many of these branched polymers are often referred to as "radial teleblock copolymers", as described in U.S. Pat. Nos. 4,373,055; 4,313,864; 4,126,600; 4,097,550; and 3,281,383; all incorporated herein by reference. The materials are also generally described in *Anionic Polymerization—Kinetics, Mechanisms, and Synthesis*, J. E. McGrath, Editor, ACS Symposium Series 166, 1981; and in *Principles of Polymerization*, G. Odian, Second Edition, John Wiley & Sons, Inc., 1981. While available commercially, the materials can also be made by techniques known in the art. For example, conjugated dienes can be polymerized with vinyl aromatic compounds in the presence of an organometallic initiator such as n-butyl lithium. The resulting copolymers contain a metal (e.g., lithium) counter-ion associated with the polymer chain ends. The carbanionic sites on the polymers are then reacted with electrophilic compounds, thereby terminating each chain. When a coupling agent which has at least three active sites is employed, the resulting copolymers have relatively long branches which radiate from a nucleus formed by the polyfunctional coupling agent.

Examples of suitable coupling agents used to prepare these branched polymers are described in the above-referenced patents, and include divinyl benzene, multi-functional epoxides, polyisocyanates, tri- or tetra-functional silicon halides such as silicon tetrachloride; epoxidized polybutadiene, and mixtures of any of the foregoing. Commercial epoxidized polybutadiene coupling agents are available under the trade name Oxiron. The amount of coupling agent present is usually in the range of about 0.1–1.0 parts by weight, based on 100 parts by weight of the branched polymer.

The molecular weight of the radial teleblock copolymer can vary broadly, but is usually in the range of about 100,000 to about 350,000. The copolymers generally comprise about 1 to 45 parts by weight of a vinyl aromatic compound and about 99 to 55 parts by weight of the conjugated diene, based on the weight of the polymer.

The styrene/diene ratio for component (b) is most often in the range of about 25:75 to about 55:45, and more preferably, in the range of about 30:70 to about 50:50. Those of ordinary skill in the art will be able to select the most appropriate range based on various factors, such as the degree of elasticity intended for this component.

Hydrocarbon rubber extending oils for component (b) are generally known in the art. They are usually paraffinic or naphthenic oils, or mixtures comprising such oils, obtained as fractions of refined petroleum products. The oils are typically combinations of aliphatic, aromatic, and cycloaliphatic components; and in preferred embodiments, contain less than about 30% by weight of aromatics. As an illustration, some of these oils contain about 70% to about 95% by weight saturated aliphatic and/or cycloaliphatic compounds; about 5% to 30% by weight aromatic compounds, and about 0.1% to 5% by weight of polar compounds. Suitable materials are described in U.S. Pat. Nos. 4,758,506; 4,314,926; 4,126,600; and 4,104,323, all incorporated herein by reference. Commercially-available oils for this invention are the SHELLFLEX ® Oils, available from Shell Oil Company, e.g., grades 111, 132, 212, 371 and 702.

The amount of extending oil in component (b) depends on several factors, such as the degree of plasticization desired for the component. In general, the level of extending oil will range from about 5% by weight to about 55% by weight, based on the total weight of component (b). In more preferred embodiments, the level will range from about 25% by weight to about 50% by weight; and in most preferred embodiments, will range from about 35% by weight to about 45% by weight.

Furthermore, in preferred embodiments of this invention, component (b) will be characterized by a Brookfield Viscosity value of between about 150 cps to about 1700 cps, as measured in a toluene solution at 77 degrees Fahrenheit (based on a plasticized polymer concentration of 25% by weight).

As mentioned above, the styrene/diene block copolymer and rubber extending oil of component (b) must be preformed prior to incorporation of the component into the concentrate. These subcomponents can be preformed by intimately admixing, using conventional mixing techniques, e.g., a single- or twin screw extruder or Banbury mixer. Techniques for admixing in this manner are described, for example, in the *Kirk-Othmer Encyclopedia of Chemical Technology*, Third Edition, John Wiley & Sons, Inc., 1982, Volume 20, the contents of which are incorporated herein by reference. This reference describes rubber compounding via various techniques, e.g., roll mills and internal mixers, continuous mixers, and mill mixing (pages 365 et seq.) As one specific example, the use of a Banbury mixer to thoroughly combine rubber and petroleum oil is described on pages 439–441. PCT Application WO 88/00603 of J. Francis et al, published Jan. 28, 1988, also describes suitable mixing techniques for rubbers and oils, and is incorporated herein by reference. Those of ordinary skill in the area of rubber-compounding can make suitable adjustments in a particular compounding technique without undue experimentation, based on various factors, such as the particular type of equipment being used, as well as the type of rubber and hydrocarbon oil employed.

Component (c) of this invention is the blowing agent itself, which is responsible for the expansion of the base resin (to which the concentrate is added during polymer processing) into a cellular foam. A variety of blowing agent compounds may be used in this invention; many are described in *Modern Plastics Encyclopedia*, McGraw-Hill, Inc., Mid-October 1989 Issue, Volume 66, Number 11, pp 184–188 et seq., the contents of which are incorporated herein by reference. Various blowing agents, as well as methods for using them, are also described in U.S. Pat. Nos. 4,554,294; 4,444,679; 4,438,223; 4,425,442; 4,369,126; and 4,312,776, all incorporated herein by reference.

Those of ordinary skill in the art of foamed plastics will be able to select an appropriate blowing agent for this invention, based on various factors. For example, the agent must, upon decomposition, yield the necessary amount of gas for polymer expansion. Furthermore, the gas formation must take place at a temperature close to the processing temperature of the base resin. Moreover, the blowing agent should be easily dispersible within the polymer melt. Yet another factor involves the decomposition products of the blowing agent: they must be compatible with the base resin (e.g., no detrimental effect like corrosion potential or severe color change), as well as being environmentally acceptable.

Chemical blowing agents are preferred for this invention. They are either endothermic or exothermic. Examples of suitable blowing agents are aluminum hydroxide-based compounds; acid-carbonate based compounds such as those derived from sodium bicarbonate; hydrocerol; sodium borohydride; benzamides; hydrazodicarboxylates; dihydrooxadiazinone-based compounds; and amide derivatives of azodicarboxylic acid.

As mentioned above, dihydrooxadiazinone-based compounds are very suitable as blowing agents for this invention. Many of these are described by M. Rosenblum et al, J. Amer. Chem. Soc., 85, 3874 (1963). Suitable dihydrooxadiazinones are also described in U.S. Pat. Nos. 4,334,030 and 4,097,425, both of which are incorporated herein by reference. Many are represented by the formula

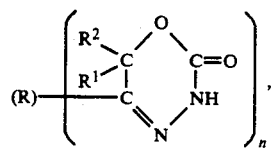

wherein n is an integer equal to 1 or 2; R is a monovalent group when n is 1 and a divalent group when n is 2, and is selected from the group consisting of $C_{(1-8)}$ alkyl groups or alkylene groups; $C_{(6-30)}$ aryl groups or arylene groups, and halogenated derivatives of any of the foregoing; and $R^1$ and $R^2$ are independently selected from the group consisting of hydrogen, $C_{(1-8)}$ alkyl or alkylene groups, and $C_{(6-30)}$ aryl, alkoxy, or aryloxy groups. When $R^1$ and $R^2$ are both alkyl, they can be part of a cycloaliphatic ring structure. Many specific examples of various groups which may constitute part of formula II are provided in U.S. Pat. No. 4,334,030.

Illustrative dihydrooxadiazinones which can be used here are as follows:
5,6-dimethyl-3,6-dihydro-1,3,4-oxadiazin-2-one;
5-ethyl-6-methoxy-3,6-dihydro-1,3,4-oxadiazin-2-one;
5-phenyl-3,6-dihydro-1,3,4-oxadiazin-2-one;
5-naphthyl-3,6-dihydro-1,3,4-oxadiazin-2-one;
5-(m-nitrophenyl)-3,6-dihydro-1,3,4-oxadiazin-2-one; and
5-phenyl-6-cyano-6-methyl-3,6-dihydro-1,3,4-oxadiazin-2-one.

Polycyclic dihydrooxadiazinones resulting from divalent substitution are also possible, as described in the above-mentioned U.S. Pat. No. 4,334,030.

The amide derivatives of azodicarboxylic acid are the preferred blowing agents for many embodiments of this invention. Many of these compounds are represented by the formula

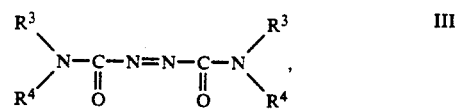

wherein $R^3$ and $R^4$ are independently selected from hydrogen and alkyl groups having from about 1 to about 10 carbon atoms. These agents are described, for example, in the above-mentioned U.S. Pat. No. 4,334,030. Azodicarbonamide is a preferred compound of this type.

As mentioned above, mixtures of blowing agents are also possible. For example, a mixture of an amide derivative of azodicarboxylic acid and a dihydrooxadiazinone may be used, as described in U.S. Pat. No. 4,334,030.

The level of blowing agent (component c) present in the concentrate depends on various factors commonly involved in thermoplastic foaming, such as the particular agent employed and the type of base resin being used. In general, though, the blowing agent will be present at a level of about 1% by weight to about 20% by weight, based on the weight of the entire concentrate, and more preferably, in the range of about 5% by weight to about 15% by weight. In certain especially preferred embodiments, the level is in the range of about 7%–10% by weight, In optional embodiments, the concentrate can further include poly(tetrafluorethylene) (PTFE) resin. The applicant for the present invention has discovered that, surprisingly, such a material acts as a nucleating agent to initiate the expansion of certain base resins, such as polyphenylene ether resin (PPE), during foam injection molding processes.

PTFE resins are known in the art and are described, for example, in *The Condensed Chemical Dictionary*, Tenth Edition, copyright 1981 by Van Nostrand Reinhold Company, as well as in U.S. Pat. No. 4,332,714 of W. Haaf et al, incorporated herein by reference. PTFE is often advantageously supplied in the form of a concentrate in a polystyrene-based carrier resin such as HIPS or crystal polystyrene.

The level of PTFE in the blowing agent concentrate is usually in the range of about 0.01% by weight to about 2.0% by weight, based on the weight of the entire concentrate, and more preferably, in the range of about 0.03% to about 0.5% by weight.

In some embodiments—usually those in which the base resin in which the blowing agent concentrate will be utilized is one comprising polyphenylene ether (PPE)—the concentrate also contains minor amounts of PPE. The level of PPE is usually no greater than about 5.0% by weight, based on the weight of the entire concentrate; and preferably, in the range of about 0.1% to about 1.0% by weight.

There is nothing critical about the technique for preparing the concentrate of this invention. Known methods of mixing may be employed. For example, all of the components can be compounded in a conventional mixer, dropped into an extruder, and then pelletized. Alteratively, all of the ingredients except the blowing agent compound (component c) can be precompounded, followed by the addition of component (c) in the mixer or extruder. Those of ordinary skill in the art will be able to adjust mixing techniques without undue experimentation.

The blowing agent of the present invention may be utilized to prepare foamed materials based on a variety of thermoplastic organic polymers. Non-limiting examples of such materials are provided, for example, in the above-mentioned U.S. Pat. No. 4,334,030. Illustrative materials include polyimides such as polyetherimides; polyphenylene sulfide, urethane elastomers; polyacetals, styrene-acrylonitrile (SAN) copolymers; acrylic-styrene-acrylonitrile (ASA) terpolymers, acrylonitrile-butadiene-styrene (ABS) terpolymers, polycarbonates, alloys of polycarbonate and ABS; polyarylsulfones; polyphenylene ether (PPE)-based resins; polyvinylchloride; polyamide resins; polystyrene-based resins; polyesters; elastomeric polyesters such as copolyetheresters; polyacrylates; and polyolefins such as polyethylene and polypropylene. Blends or copolymers of any of the foregoing are also possible, e.g., a blend of PPE and polyamide resin.

Foamable compositions of this invention may be prepared using known techniques, e.g., some of which are described in the above-mentioned *Modern Plastics* reference; in U.S. Pat. No. 4,692,475; as well as in *Plastic Additives*, R. Gachter and H. Muller, Hanser Publishers, Munich 1987, pp 619 et seq. Another publication is instructive in this area as well: *The Handbook of Engineering Structural Foam*, General Electric Publication SFR-3 (20M 1/78). Its contents are also incorporated herein by reference.

As an illustration, the thermoplastic organic polymers can be made in the form of powder or extruded pellets. An effective amount of the blowing agent concentrate, i.e., an amount effective to form a foamable composition, is then added to the organic polymer. After addition of the concentrate, the resulting composition is exposed to heat to expand the foamable polymer and form the expanded polymeric composition. Of course, the density and other physical and performance characteristics of the expanded composition can be adjusted by varying blowing conditions and concentrate composition.

Engineering structural foams prepared by injection molding are of particular interest, since such a molding technique is especially useful in the design and fabrication of large, complex plastic parts. These injection molding processes can be carried out by either introducing an inert gas directly into the melted thermoplastic composition, or by preblending the thermoplastic resin with a chemical blowing agent which, when heated during processing, releases inert gas that disperses throughout the polymer melt. When the gas/resin mixture is shot under pressure into the mold cavity, the gas expands within the plasticized material as it fills the mold, producing an internal cellular structure as well as a tough external skin at the mold surface. Large parts can be injection molded at low mold pressures, due to the self-expanding character of the plasticized material.

Structural foam molding processes involve combining molten thermoplastic with a blowing agent in the melt, which is stored under pressure and is injected into the mold cavity for expansion of the compressed gases. This expansion of the melt creates the cellular structures, and maintains internal pressure on the external skin during cooling, thereby reducing sink marks.

Both low pressure and high pressure foam processing methods are possible for this invention. Low pressure processes employ both a chemical blowing agent and a physical blowing agent such as nitrogen, while high pressure processes generally employ only chemical blowing agents. Both techniques are known in the art and are described, for example, in copending application Ser. No. 07/984,782 of A. M. Burnell, A. Berzinis, T. Conroy, and K. Balfour, filed on Dec. 3, 1992, and assigned to the assignee of the present invention, the contents of which are incorporated herein by reference, as well as in the above-mentioned General Electric publication, SFR-3 (20M 1/78).

As mentioned above, an effective amount of the concentrate is used in preparing the foamable compositions of this invention. This amount is conveniently provided in terms of the amount of blowing agent compound (i.e., component c) as a percentage of the entire foamable composition. In the practice of this invention, the amount of component (c) is usually in the range of about 0.1% by weight to about 5% by weight, based on the weight of the entire foamable composition (i.e., including the concentrate itself. In preferred embodiments, the amount of component (c) is in the range of about 0.1% by weight to about 3% by weight, and in most preferred embodiments, is in the range of about 0.2% by weight to about 1% by weight.

The foamable compositions can also include effective amounts of a wide variety of other additives, depending on the given end-use for the foam. These additives are known in the art, as are their effective levels and method of incorporation. Non-limiting examples of such additives are flame retardants such as aromatic phosphate compounds; plasticizers, stabilizers (e.g., oxidative, thermal, and ultraviolet light); antistatic agents, fillers, e.g., mineral fillers; reinforcing agents such as glass or carbon fiber; colorants, dyes, pigments, drip retardants, and other processing aids. Nucleating agents can also be contained in the foamable compositions, in addition to or in lieu of the nucleating agents which are present in the concentrate itself Non-limiting examples of nucleating agents are milled glass, glass fibers or spheres, silicates, clay, carbon fibers, and mica. Effective amounts for these additives vary widely, but they are usually present in an amount of from about 1% to 50% by weight, based on the weight of the entire composition, and in most instances, from about 1% by weight to about 40% by weight.

It should be clear from the above discussion that the present invention includes within its scope the foamed thermoplastic structures themselves, e.g., in the form of sheet or various shapes. These structures can be prepared, for example, by conventional molding techniques (some of which were summarized previously), utilizing the above-described blowing agent concentrate. These structures have many advantageous properties, such as improved cellular structure and surface characteristics.

The following examples are provided to illustrate some embodiments of the present invention. They are not intended to limit the invention in any aspect. All parts and percentages are by weight unless otherwise indicated.

EXAMPLES

Example 1

Various precursor blends containing the preformed combination of a styrene/diene block copolymer and a hydrocarbon rubber extending oil were prepared. The blends contained approximately 90 to 95 parts of either medium-impact polystyrene (rubber-modified homopolystyrene, with a rubber/polystyrene ratio of about 8:92) ("MIPS") or high impact polystyrene (i.e., "HIPS": rubber-modified homopolystyrene, with a rubber/polystyrene ratio of about 10:90). The MIPS or HIPS was compounded with a twin screw extruder with varying amounts (5 to 10 parts) of Shell Oil Company's KD-4240, a styrene/butadiene-based branched copolymer which is said to contain about 46% of a Shellflex hydrocarbon rubber-extending oil. Compounding was carried out at a temperature of about 450°–500° F.

According to product literature, the Shellflex oil is comprised of a mixture of aromatic, aliphatic, and cycloaliphatic compounds, and based on the manufacturer's carbon atom analysis, has about 1-5% aromatic carbon atoms; about 40–60% naphthenic carbon atoms; and about 40–60% paraffinic carbon atoms. The Shellflex oil has an estimated molecular weight in the range of about 270 to about 400. The styrene/rubber ratio in KD-4240 is reportedly about 44:56.

The blends also included 0.1 to 1 part PPE resin and 0.3 to 1 part of a PTFE concentrate (10% in rubber-modified polystyrene).

Example 2

Various amounts of the blends prepared in Example 1 were subsequently compounded with azodicarbonamide, using a continuous mixer. The compounded material was then passed through a single screw extruder and pelletized. The resulting compositions were determined by nitrogen analysis, and are depicted in Table 1:

TABLE 1

Analysis of Blowing Agent Concentrate

| | Sample # | | | | | | |
|---|---|---|---|---|---|---|---|
| | 1 | 2 | 3 | 4 | 5 | 6 | 7* |
| Calculated amount of blowing agent (pbw) | 10 | 7.5 | 5 | 3 | 7.5 | 5 | 100 |
| Calculated amount of carrier** (Ex. 1) (pbw) | 90 | 92.5 | 95 | 97 | 92.5 | 95 | — |
| Amount of blowing agent by $N_2$ analysis (%) | 8.8 | 7.4 | 4.6 | 2.8 | 6.4 | 4.5 | 100 |

*Control
**All ingredients except blowing agent

Example 3

A blowing agent concentrate sample very similar to sample 2 of Example 2 was prepared in the same manner, and determined (% $N_2$ analysis) to contain 7.4% azodicarbonamide in a MIPS carrier.

Pellets containing PPE and polystyrene in approximately a 50:50 weight ratio were tumbled with the concentrate; while identical PPE/polystyrene pellets were tumbled with an identical amount of a comparative blowing agent concentrate based on a combination of azodicarbonamide and 5-phenyl-3,6-dihydro-1,3,4-oxadiazin-2-one in approximately a 75:25 weight ratio. For each sample, the weight ratio of blowing agent concentrate to PPE/polystyrene was about 0.05:1.

The resulting mixtures were injection-molded into a 12" by 22" plaque tool, using a Siemag 110 ton injection molding machine. The processing conditions were varied to include long and short cycles as well as high and low temperatures. The plaques, having a thickness of 250 mil, were cut into six 4" by 4" sections and tested for impact strength via Dynatup. The impact strength values are provided in Table 2, along with a general description of the fracture surface.

TABLE 2

Structural Foam Properties and Characteristics as a Function of Molding Cycle

| | Cycle Time/ Temperature | Dynatup value (avg., ft-lb-in) | Cell Structure, Appearance |
|---|---|---|---|
| Sample 6* | 2 min, 515° F. | 27.2 | Cells generally small, uniform across fracture surface |
| Comparative sample 6** | 2 min, 515° F. | 31.5 | Less uniform cell structure; cells generally larger |
| Sample 7* | 1.75 min, 580° F. | 23.0 | Cells generally small; even distribution perpendicular to walls |
| Comparative sample 7* | 1.75 min, 580° F. | 24.0 | Cells generally uniform in size, but larger than in sample 7; non-uniform distribution |
| Sample 8* | 4 min, 515° F. | 26.0 | Small, uniform cell distribution |
| Comparative sample 8** | 4 min, 515° F. | 30.4 | Less uniform cell distribution |
| Sample 9* | 4.25 min, 580° F. | 20.3 | Small, uniform cell distribution |
| Comparative sample 9** | 4.25 min, 580° F. | 12.6 | Non-uniform cell distribution; large cells |

*Uses concentrate of this invention, prepared as in Example 2.
**Uses comparative blowing agent concentrate, as described above.

In addition to more uniform cell distribution, the samples of this invention exhibited greater color stability. For example, as the cycle time and temperature for the samples of Table 2 were increased, the samples which contained the comparative blowing agent concentrate exhibited a color shift of approximately 11 units, as measured in delta E units (FMC2) obtained by the use of a spectrophotometer. In contrast, samples 6-9 exhibited a color shift of only about 1.2 units.

Example 4

This example demonstrates that precompounding of the various components of the concentrate (i.e., prior to addition of the blowing agent itself) is not critical.

A separate feed stream of approximately 80 to 85 parts of MIPS is compounded through a continuous mixer with about 3-11% of a second feed stream containing a blend of about 90-99% azodicarbonamide and 1-10% PPE; and a third feed stream containing about 4.5-9% of the preformed blend of a styrene/diene block copolymer and a hydrocarbon rubber extending oil, KD4240. Mixer melt temperatures during compounding were in the range of about 310°- 360° F. The compounded mixture was then passed through a single screw extruder at approximately 330°-360° F., and pelletized.

Example 5

The specific composition (based on the present invention) of each concentrate used in this example is as follows:

| | |
|---|---|
| KD 4240 | 4.5 pbw |
| MIPS | 84.6 pbw |
| Azodicarbonamide | 10.0 pbw |
| PPE | 0.95 pbw |

This concentrate was prepared as in Example 4.

The specific composition of the comparative concentrate was:

| | |
|---|---|
| HIPS | 72.0 pbw |
| Phosphate A* | 11.7 pbw |
| Phosphate B** | 21.8 pbw |
| PPE(0.46 IV) | 4.0 pbw |
| Azodicarbonamide | 7.5 pbw |
| 5-phenyl-3,6-dihydro-1,3,4-oxadiazin-2-one | 2.5 pbw |

*Triphenyl phosphate
**Mixture comprising triphenyl phosphate and alkylated derivatives thereof Samples 10 and 11 were prepared by tumbling PPE/polystyrene pellets (weight ratio of about 45:55) with the above-described concentrate of this invention, at a ratio (PPE/polystyrene to concentrate) of 0.03:1. The resulting samples contained 6.7% azodicarbonamide in the styrene carrier, as determined by gas yield measurement.

Sample 12 (comparative sample), which contained the comparative concentrate described above, was tumbled with the PPE/polystyrene pellets at a ratio of 0.06:1.

Each mixture was then injection molded at 560° F. into a product evaluation tool for PPE resins. The molded plaques were then evaluated for paint adhesion. Conventional waterborne paint systems were used:

Primer: 296WLE19627gray Hydroplas (waterborne) for NORYL ® resins, available from Red Spot.

Topcoat: 284HS10941 NCR gray Duraplas (2.8 VOC-2K), a two-component urethane, available from Red Spot.

A peel adhesion test was used, along with a cross hatch test (X-scribe, using 898 fiber-reinforced 3M tape).

The results are summarized in Table 3:

TABLE 3

| | Paint Adhesion Evaluation Adhesion Results | | |
|---|---|---|---|
| Sample Number→ | 10 | 11 | 12[a] |
| no primer | | | |
| Cross Hatch | Pass | Pass | Fail[b] |
| Peel[c] | 0.56 C | 0.75 PS | 0.55 PS |
| primer | | | |
| Cross Hatch | Pass | Pass | Pass |

TABLE 3-continued

| | Paint Adhesion Evaluation Adhesion Results | | |
|---|---|---|---|
| Sample Number→ | 10 | 11 | 12[a] |
| Peel[c] | 0.50 C | 0.62 C | 0.56 C |

[a]Control
[b]Extent of failure was 25%
[c]Higher peel values indicate better adhesion
C = cohesive paint failure
PS = mixed cohesive & substrate failure.

The results in Table 3 indicate that articles formed from the compositions of this invention allow better adhesion of coatings to the unprimed article surface. The "cohesive paint failure" characteristic of sample 10 represents better adhesion than the "PS" value of sample 12, while the numerical value of 0.75 for sample 11 is higher than the 0.55 value for sample 12.

In general, there did not appear to be significant differences in adhesion characteristics for the primed surfaces.

Example 6

In this example, compositions containing the preformed blend of a styrene/diene block copolymer and a hydrocarbon rubber extending oil were compared with compositions prepared by simply mixing various styrene/butadiene rubbers and mineral oil along with the other components in a blowing agent concentrate similar to that of the present invention.

The following preformed blends according to the present invention were used; each is commercially available from Shell Oil Company:

| Grade | Styrene/Butadiene Ratio | Level of Mineral Oil (Product Literature) | Level of Mineral Oil (by L.C.[a]) |
|---|---|---|---|
| KD-4141* | 31/69 | 29% | 17.8% |
| KD-4122* | 48/52 | 35% | 27.5% |
| KD-4158** | 30/70 | 33% | 23.7% |
| KD-4240** | 44/56 | 46% | 31.1% |

L.C.[a] = liquid chromatography
*Linear polymer
**Branched polymer

The following styrene/butadiene rubbers were employed as controls:

| Grade | Styrene/Butadiene Ratio | Level of Mineral Oil |
|---|---|---|
| KD-1101* | 31/69 | 0 |
| Fina TM 411** | 30/70 | 0 |
| KG-1650* | 29/71 | 0 |
| Steron*** 840A | 43/57 | 0 |

*Shell Oil Company
**Fina Oil & Chemical
***Firestone Company

Each sample—including those based on the control materials—contained the following:
HIPS: 88.2 pbw
PPE: 0.5 pbw
PTFE (10% in HIPS): 0.3 pbw These components were blended with each of the above-mentioned styrene/butadiene materials in a Henschel blender, along with mineral oil for the control samples. The blends were then compounded through a twin screw extruder at 400°-450° F., and pelletized. The resulting materials were characterized by liquid chromatography for percent mineral oil-retained.

TABLE 4

Mineral Oil Retention

| S. # | Type of Rubber | Amnt. of Rubber (%) | Min. Oil Level (%) | Amnt. of Min. Oil in Blend** (%) | Amnt. of Min. Oil by L.C.*** (%) | Amnt. of Min. Oil Retained (%) |
|---|---|---|---|---|---|---|
| 13 | KD4141 | 11 | 0 | 3.19 | 3.13 | 98.2 |
| 14 | KD4122 | 11 | 0 | 3.85 | 3.81 | 98.9 |
| 15 | KD4158 | 11 | 0 | 3.63 | 3.53 | 97.2 |
| 16 | KD4240 | 11 | 0 | 5.06 | 4.61 | 91.1 |
| 17* | KD1101 | 7.5 | 3.5 | 3.5 | 2.88 | 82.4 |
| 18* | Fina TM 411 | 7.1 | 4.0 | 4.0 | 2.68 | 93.2 |
| 19* | KG1650 | 7.1 | 4.0 | 4.0 | 3.11 | 78.6 |
| 20* | Stereon (840A) | 5.5 | 5.5 | 5.5 | 5.03 | 92.4 |

*Comparative samples
**Based on product literature for samples 13-16; based on calculations of amount added for samples 17-20.
***Liquid chromatography The above results demonstrate that thermoplastic compositions according to this invention generally exhibit greater mineral oil retention than comparative compositions which do not include the use of a preformed blend of a styrene/diene block copolymer and a hydrocarbon rubber extending oil. The mineral oil retention value of sample 16 was not quite as high as that of samples 13-15, but is still very acceptable in terms of end uses for this invention.

Melt flow characteristics for the samples of this invention were also very acceptable.

Example 7

The following example demonstrates that use of the preformed blend of a styrene/butadiene block copolymer with the hydrocarbon rubber extending oil (component b) permits extremely mild processing conditions to be utilized in the preparation of the concentrate. The medium-impact polystyrene (MIPS) used in Example 1 was blended with KD 4240 in a Henschel mixer, and then extruded in a 30 mm twin screw extruder at a temperature of about 400°–450° F. The level of component (b) as a percentage of the total of the two components was varied, as shown in Table 5. The table also sets forth melt viscosity values of MIPS as a function of the level of component (b).

TABLE 5

Melt Viscosity Characteristics

| Level of Component (b) (%) | Melt Viscosity (Brabender, poise) |
|---|---|
| 0 | 414 |
| 1 | 387 |
| 5 | 368 |
| 10 | 328 |

The above results demonstrate that use of the preformed blend of extending oil and styrene/butadiene block copolymer results in dramatically decreased melt viscosity values. This beneficial characteristic in turn allows for much milder polymer processing conditions.

Other modifications and variations of this invention are possible in view of the description thus provided. It should be understood, therefore, that changes may be made in the particular embodiments shown which are within the scope of the invention defined in the appended claims.

All of the patents and articles mentioned above are incorporated herein by reference.

I claim:

1. An improved blowing agent concentrate for thermoplastic polymers, comprising:
    (a) a vinyl aromatic polymer;
    (b) a preformed blend of a styrene/diene block copolymer and a hydrocarbon rubber extending oil; and
    (c) at least one blowing agent.

2. The concentrate of claim 1, wherein at least about 25% of the vinyl aromatic units in component (a) are derived from an alkenyl aromatic monomer of the formula

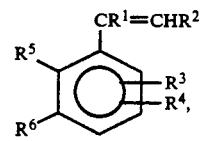

wherein $R^1$ and $R^2$ are selected from the group consisting of hydrogen and lower alkyl or alkenyl groups of from 1 to 6 carbon atoms; $R^3$ and $R^4$ are selected from the group consisting of hydrogen and lower alkyl groups of from 1 to 6 carbon atoms; and $R^5$ and $R^6$ are selected from the group consisting of hydrogen and lower alkyl and alkenyl groups of from 1 to 6 carbon atoms; or $R^5$ and $R^6$ can be concatenated together with hydrocarbyl groups to form a naphthyl group.

3. The blowing agent concentrate of claim 2, wherein the vinyl aromatic polymer of component (a) is selected from the group consisting of homopolystyrene; poly-α-methylstyrene; a styrene maleic anhydride copolymer; and a styrene-acrylonitrile copolymer.

4. The concentrate of claim 1, wherein component (a) is rubber-modified.

5. The concentrate of claim 4, wherein component (a) is butadiene-modified homopolystyrene; and the weight ratio of butadiene to homopolystyrene is in the range of about 1:99 to about 20:80.

6. The concentrate of claim 1, wherein the styrene/diene block copolymer of component (b) is linear or branched.

7. The concentrate of claim 6, wherein the hydrocarbon rubber extending oil is selected from the group consisting of paraffinic oils, naphthenic oils, and mixtures thereof.

8. The concentrate of claim 6, wherein the styrene/diene ratio for component (b) is in the range of about 25:75 to about 55:45.

9. The concentrate of claim 6, wherein the level of extending oil ranges from about 5% by weight to about 55% by weight, based on the total weight of component (b).

10. The concentrate of claim 9, wherein the level of extending oil ranges from about 25% by weight to about 50% by weight.

11. The concentrate of claim 1, wherein the blowing agent of component (c) is selected from the group consisting of hydrazodicarboxylates, benzamides, amide derivatives of azodicarboxylic acid; hydrocerol, sodium borohydride, sodium bicarbonate-based compounds; aluminum hydroxide-based compounds; dihydrooxadiazinone-based compounds; and mixtures of any of the foregoing.

12. The concentrate of claim 11, wherein the amide derivatives of azodicarboxylic acid are compounds represented by the formula

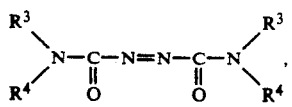

wherein $R^3$ and $R^4$ are independently selected from hydrogen and alkyl groups having from about 1 to about 10 carbon atoms.

13. The concentrate of claim 12, wherein the blowing agent is azodicarbonamide.

14. The concentrate of claim 1, wherein component (a) is present at a level of at least about 65%, based on the weight of the entire concentrate.

15. The concentrate of claim 1, wherein the blowing agent of component (c) is present at a level in the range of about 1% by weight to about 20% by weight, based on the weight of the entire concentrate.

16. The concentrate of claim 1, further comprising a poly(tetrafluoroethylene) resin.

17. The concentrate of claim 16, wherein the poly(tetrafluoroethylene) resin is present at a level in the range of about 0.01% by weight to about 2.0% by weight, based on the weight of the entire concentrate.

18. A foamable composition which comprises a thermoplastic organic polymer as a base resin, and a blowing agent concentrate which itself comprises:

(a) a vinyl aromatic polymer;
(b) a preformed blend of a styrene/diene block copolymer and a hydrocarbon rubber extending oil; and
(c) at least one blowing agent compound.

19. The foamable composition of claim 18, wherein component (c) is an amide derivative of azodicarboxylic acid.

20. The foamable composition of claim 18, wherein the thermoplastic organic polymer is selected from the group consisting of polyimides, polyphenylene sulfide, styrene-acrylonitrile copolymers, acrylic-styrene-acrylonitrile terpolymers; acrylonitrile-butadiene-styrene (ABS) terpolymers, polycarbonates; alloys of polycarbonate and ABS; polyphenylene ether-based resins; polyamide resins; polystyrene-based resins; polyesters; elastomeric polyesters; polyolefins; blends of any of the foregoing; and copolymers of any of the foregoing.

21. A foamed, thermoplastic structure molded from a composition which comprises:

(I) a thermoplastic organic polymer as a base resin, and
(II) a blowing agent concentrate which itself comprises:
(a) a vinyl aromatic polymer;
(b) a preformed blend of a styrene/diene block copolymer and a hydrocarbon rubber extending oil; and
(c) at least one blowing agent compound.

22. The foamed structure of claim 21, prepared by injection molding.